United States Patent [19]

Edwards et al.

[11] Patent Number: 5,318,065
[45] Date of Patent: Jun. 7, 1994

[54] COLOR VALVE MULTIPLEXER

[75] Inventors: Scott A. Edwards; Daniel C. Hughey, both of Indianapolis, Ind.

[73] Assignee: Ransburg Corporation, Indianapolis, Ind.

[21] Appl. No.: 979,204

[22] Filed: Nov. 20, 1992

[51] Int. Cl.⁵ .............................................. G05B 11/01
[52] U.S. Cl. ................... 137/624.2; 118/695; 118/696; 118/698; 239/69
[58] Field of Search .............. 118/695, 696, 698; 137/624.18, 624.2; 239/69

[56] References Cited

U.S. PATENT DOCUMENTS

| | | |
|---|---|---|
| 4,278,046 | 7/1981 | Clarke et al. . |
| 4,311,724 | 1/1982 | Scharfenberger . |
| 4,332,105 | 6/1982 | Nir . |
| 4,348,425 | 9/1982 | Scharfenberger . |
| 4,422,576 | 12/1983 | Saito et al. . |
| 4,517,456 | 5/1985 | Halsall et al. . |
| 4,592,305 | 6/1986 | Scharfenberger . |
| 4,604,967 | 8/1986 | Wilbur, Jr. et al. . |
| 4,669,502 | 6/1987 | Lonardi et al. . |
| 4,712,173 | 12/1987 | Fujiwara et al. ............ 91/361 X |
| 4,913,032 | 4/1990 | Wernberg ..................... 91/361 |
| 4,957,060 | 9/1990 | Cann . |
| 4,966,065 | 10/1990 | Wardle ........................ 91/361 |
| 4,984,505 | 1/1991 | Leeson et al. ................ 91/361 |
| 5,014,645 | 5/1991 | Cann et al. . |
| 5,048,394 | 9/1991 | McLevige et al. ........... 91/361 |
| 5,054,369 | 10/1991 | Wardle et al. ............... 91/361 |
| 5,058,812 | 10/1991 | Cox et al. . |
| 5,081,903 | 1/1992 | Wardle et al. ............... 91/361 |
| 5,088,383 | 2/1992 | Wardle et al. ............... 91/361 |

OTHER PUBLICATIONS

Ernst, Greg, "Intrisic Safety—An Alternative to Explosion-Proof," *Measurements and Control*, Apr. 1987, pp. 148-151.

*Primary Examiner*—Gerald A. Michalsky
*Attorney, Agent, or Firm*—Barnes & Thornburg

[57] ABSTRACT

A coating material dispensing system comprises a hazardous area and a non-hazardous area. Multiple coating material type controls have coating material input ports, coating material output ports, and control ports for controlling the passage of a type of coating material controlled by each respective coating material type control from its input port to its output port. A controller generates control signals for controlling the multiple coating material type controls. The control signals are multiplexed in the non-hazardous area, and transmitted into the hazardous area where they are demultiplexed and provided to the coating material type controls. The demultiplexer and coating material type controls are intrinsically safe.

10 Claims, 7 Drawing Sheets

COLOR VALVE MULTIPLEXER

This invention relates to techniques for controlling the flow of coating materials from multiple sources through a manifold for distribution to a coating dispensing device.

The technology of coating materials distribution is well documented. There are, for example, the systems described in the following listed U.S. Pat. Nos. 4,311,724; 4,348,425; 4,422,576; and 4,592,305.

There are two primary techniques for enhancing the safety of such coating material distribution systems by reducing the likelihood of ignition of explosive mixtures during the operation of such systems. One of these techniques involves so-called "explosion-proof" technology. This technology employs electrical conduit and other appropriate housing of all electrical components and connections, and other appropriate precautions, to contain any internal explosion without bursting or allowing ignition to reach outside the housing. Explosion-proof technology is rather difficult and expensive to implement, requiring as it does the provision of electrical conduit and enclosures, even in a coating material application booth, for all electrical wiring and related electrical components.

The other technology is generally referred to as "intrinsically safe" technology. The concept underlying intrinsically safe technology is to design equipment which will not have sufficient energy to support an igniting spark in any normal or foreseeable failure mode of operation. Intrinsically safe technology is discussed in some detail in U.S. Pat. No. 4,957,060 and references cited there, notably U.S. Pat. No. 4,278,046 and Ernst Greg, "Intrinsic Safety—An Alternative to Explosion-Proof", *Measurements and Control*, April, 1987, pp. 148-151.

Present automotive coating lines are capable of dispensing many paint colors. Many recent automotive installations, for example, are capable of dispensing 27 colors. Current technology includes the following control hardware for each color valve: One programmable logic controller (PLC) digital output, one channel of electrical-to-pneumatic conversion and one pneumatic pilot line from the electrical-to-pneumatic conversion device (solenoid) to the color valve in the spray booth. A typical section of an automotive application booth uses nine or ten atomizers. Since each atomizer requires one set of this control hardware for each color, the volume and cost of control hardware quickly escalates.

In systems of the type described in U.S. Pat. No. 4,957,060, pneumatic signals are coupled to the color valves on the color change manifold from a remote source. Intrinsically safe technology is employed in the described system.

U.S. Pat. No. 4,332,105 describes an output demultiplexer/latch combination for controlling pumps, heaters, fans, and flow valves. However, this reference does not specify what information is demultiplexed nor does it specify how the flow valves relate to each other. The reference disclosed a discrete connection of each flow valve to the control system. No specific valve control architecture is claimed.

U.S. Pat. No. 4,517,456 discloses a fiber optic cable for the transmission of multi-wavelength light for sensory and diagnostic purposes. No control data or structured pulses are transmitted by the light beam.

U.S. Pat. No. 4,604,967 discloses a system which utilizes binary coded decimal (BCD) format for data input. BCD data format is a common data format.

U.S. Pat. No. 4,669,502 discloses a system wherein demultiplexer logic receives four bits of information from the control logic to determine the state of discrete solenoids attached to its outputs. This configuration of the demultiplexer circuitry is common.

U.S. Pat. No. 5,058,812 and U.S. Pat. No. 5,014,645 disclose color manifolds and pneumatically controlled color valves. These are standard components in the coating material application industry.

The invention may best be understood by referring to the following description and accompanying drawings which illustrate the invention. In the drawings.

Figure 1:
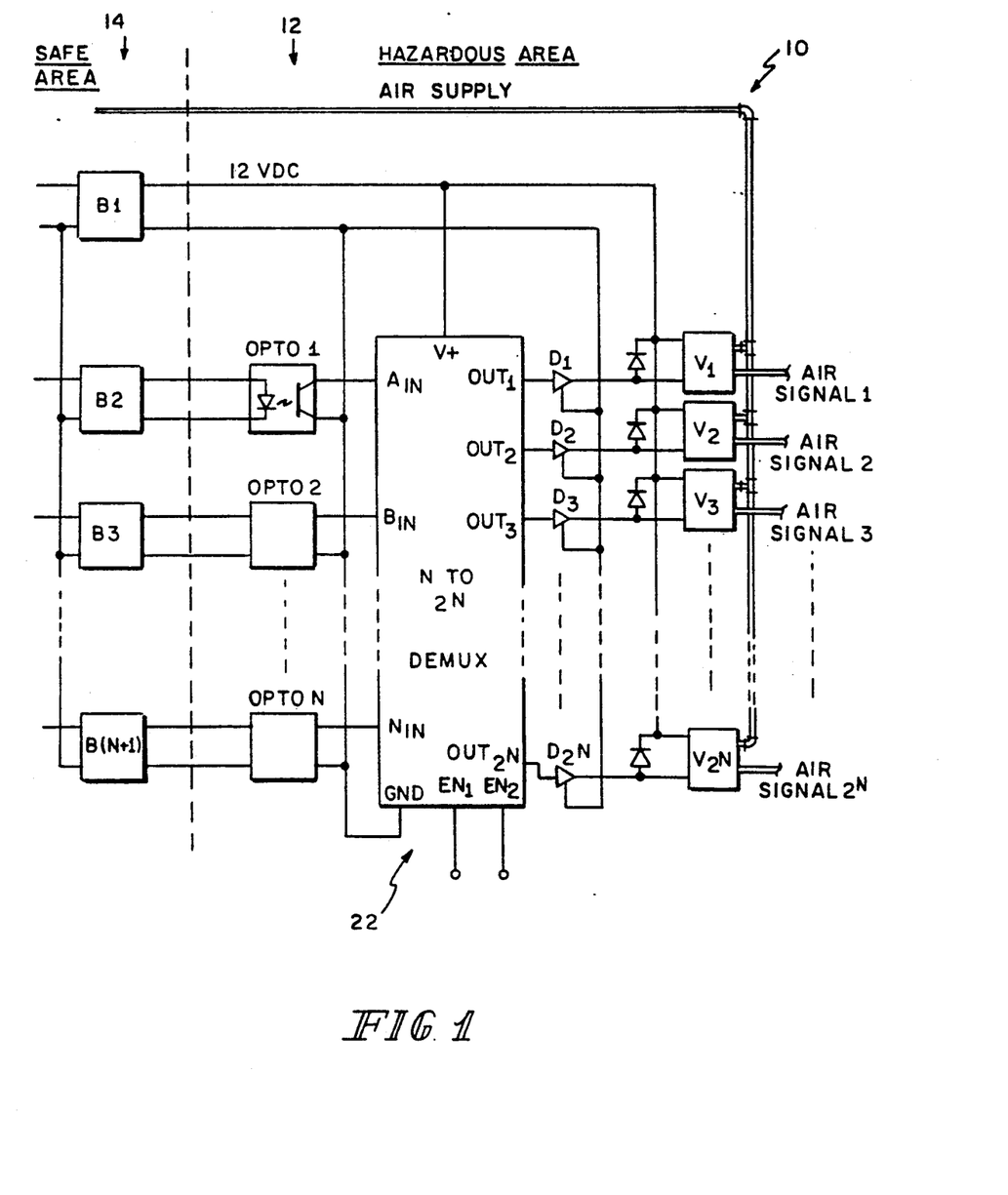
FIG. 1 illustrates a partly block and partly schematic diagram of a portion of a system constructed according to the present invention.

Referring now particularly to FIG. 1, conceptually, coating material dispensing equipment 10 in a hazardous area 12 is being controlled from a non-hazardous area 14. Area 12 may be, for example, a spray booth in which coating material is being atomized and electrostatically charged and dispensed onto articles to be coated thereby. Air signals $1, 2 \ldots 2^N$ for controlling various color valves (not shown) which control the dispensing of the various colors of coating material onto respective ones of the articles that pass through the booth for coating are supplied from air valves $V_1, V_2 \ldots V_{2^N}$. The air signal 1 from air valve $V_1$, controls the state of a first of the color valves, the air signal 2 from air valve $V_2$ controls the state of a second of the color valves, and so on. Of course, a maximum of one such color valve will be in the "on" state (dispensing a respective color) at a time. One or more of the valves, $V_1, V_2 \ldots V_{2^N}$ may, instead of colors, dispense solvent or air used for cleaning colors from the atomizing and dispensing equipment during a color change cycle, as is known.

The air which valves $V_1, V_2 \ldots V_{2^N}$ convert into signals is supplied from a source through an air line 20 from, for example, a factory compressed air source of suitable pressure. Since valves $V_1, V_2 \ldots V_{2^N}$ are in the area 12, they must be coupled to a suitable power supply, for example, +12VDC, through a current barrier $B_1$. Current barrier $B_1$ renders the operation of valves $V_1, V_2 \ldots V_{2^N}$ in area 12 safe. Appropriate drivers $D_1, D_2$ and $D_{2^N}$ are provided to drive valves $V_1, V_2, \ldots V_{2^N}$, respectively, and drivers $D_1, D_2$ and $D_{2^N}$ are also coupled to the power supply through the current barrier $B_1$. Since only one color is being dispensed at a time, only one driver $D_1, D_2 \ldots D_{2^N}$ will be on at any time, which make it easier to use a single current barrier $B_1$ to supply them all.

To minimize the number of control lines that must cross from area 14 into area 12, and therefore system complexity and cost, multiplexing and demultiplexing of the control signals for valves $V_1, V_2, \ldots V_{2^N}$ is employed. Depending upon the number $2^N$ of valves to be controlled, N current barriers, numbered $B_2, B_3 \ldots B_{N+1}$ are employed in the control process. For example, if eight valves $V_1-V_8$ are to be controlled, then only three additional current barriers $B_2$, $B_3$ and $B_4$ are employed. If thirty-two valves $V_1-V_{32}$ are to be controlled, then five additional current barriers $B_2-B_6$ will be required. In any event, the control signals which control the opening of the various valves $V_1-V_{2N}$ are supplied to the current barriers $B_2-B_{N+1}$. These are coupled through the barriers $B_2-B_{N+1}$ to render the control signals safe and are supplied to respective input terminals of optical isolators OPTO1, OPTO2, ... OPTON. Each optical isolator OPTO1, OPTO2, ... OPTON illustratively includes a light emitting diode (LED) coupled across the output terminals of its respective current barrier $B_2$, $B_3$, ... $B_{N+1}$, and a light sensitive transistor (LST), the emitter of which is coupled to the power supply and the collector of which is coupled to a respective input terminal $A_{IN}$, $B_{IN}$, ... $N_{IN}$ of an N-to-$2^N$ demultiplexer 22 in area 12. The demultiplexed control output signals are coupled from the respective output terminals $OUT_1$, $OUT_2$, ... $OUT_{2N}$ of demultiplexer 22 to respective amplifiers, illustratively MOS transistor amplifiers, $D_1$, $D_2$, ... $D_{2N}$. The output terminals of amplifiers $D_1$, $D_2$, ... $D_{2N}$ provide the demultiplexed control signals to respective valves $V_1$, $V_2$, ... $V_{2N}$.

Figure 2:
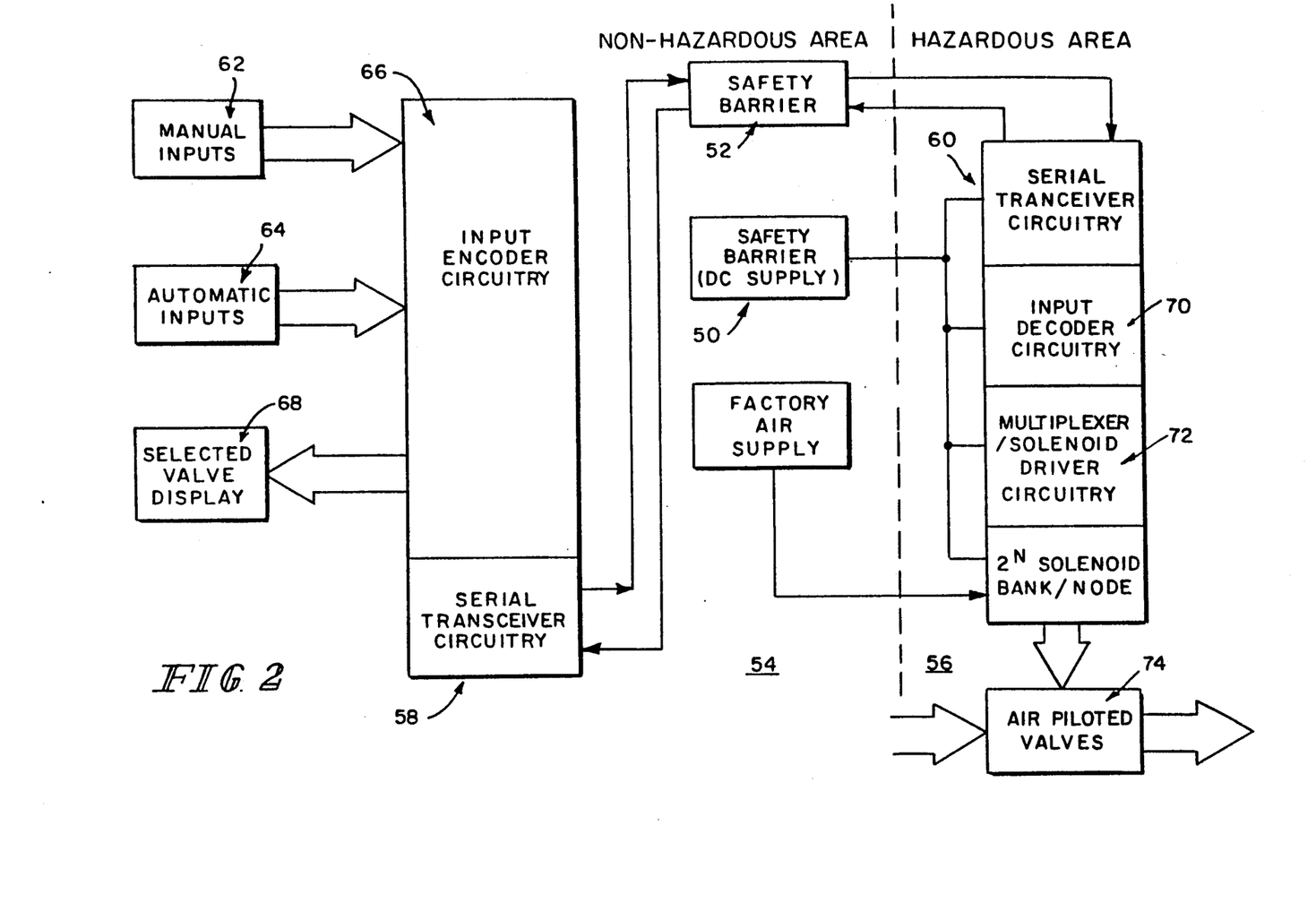
FIG. 2 illustrates a block diagram of a portion of a system constructed according to the present invention.

In the embodiment of the invention illustrated in FIG. 2, the DC supply safety current barrier B1 is illustrated by a DC supply safety barrier 50. Safety barriers $B_2$, $B_3$, ... $B_{N+1}$ are replaced by a safety barrier 52. Only a single control signal barrier 52 is required in this embodiment because control data is transmitted from non-hazardous area 54 to hazardous area 56 serially. Any data which is to flow from area 56 to area 54 is also transmitted serially. To effect this end, a serial transceiver 58 is provided in area 54 and a serial transceiver 60 is provided in area 56. Instructions for controlling the $2^N$ solenoid bank $V_1$, $V_2$, ... $V_{2N}$ in this embodiment are entered either manually by an operator through an input device 62 which may be, for example, a keyboard, or automatically through, for example, a programmable logic controller (PLC) 64. These instructions are encoded by input encoder circuitry 66 which illustratively is part of the PLC. A suitable display 68, driven from the input encoder circuitry 66, displays selected valve $V_1$, $V_2$, ... $V_{2N}$ identification indicia. The input encoder circuitry 66 supplies encoded (multiplexed) control data to the serial transceiver circuitry 58 in area 54. The multiplexed control signals are rendered safe for passage into area 56 by safety barrier 52. Once within area 56 the now safe multiplexed control signals are received by transceiver 60. The safe signals are then demultiplexed by input decoder circuitry 70 and are supplied through multiplexer/solenoid driver circuitry 72 to the $2^N$ solenoid bank $V_1$, $V_2$, ... $V_{2N}$. The safe, decoded control signals are then supplied to the various air piloted color valves 74 to control the dispensing of the various colors, cleaning solvents, solvent-drying air and whatever other services are needed within area 56 to control the coating operation taking place there.

Figure 3:
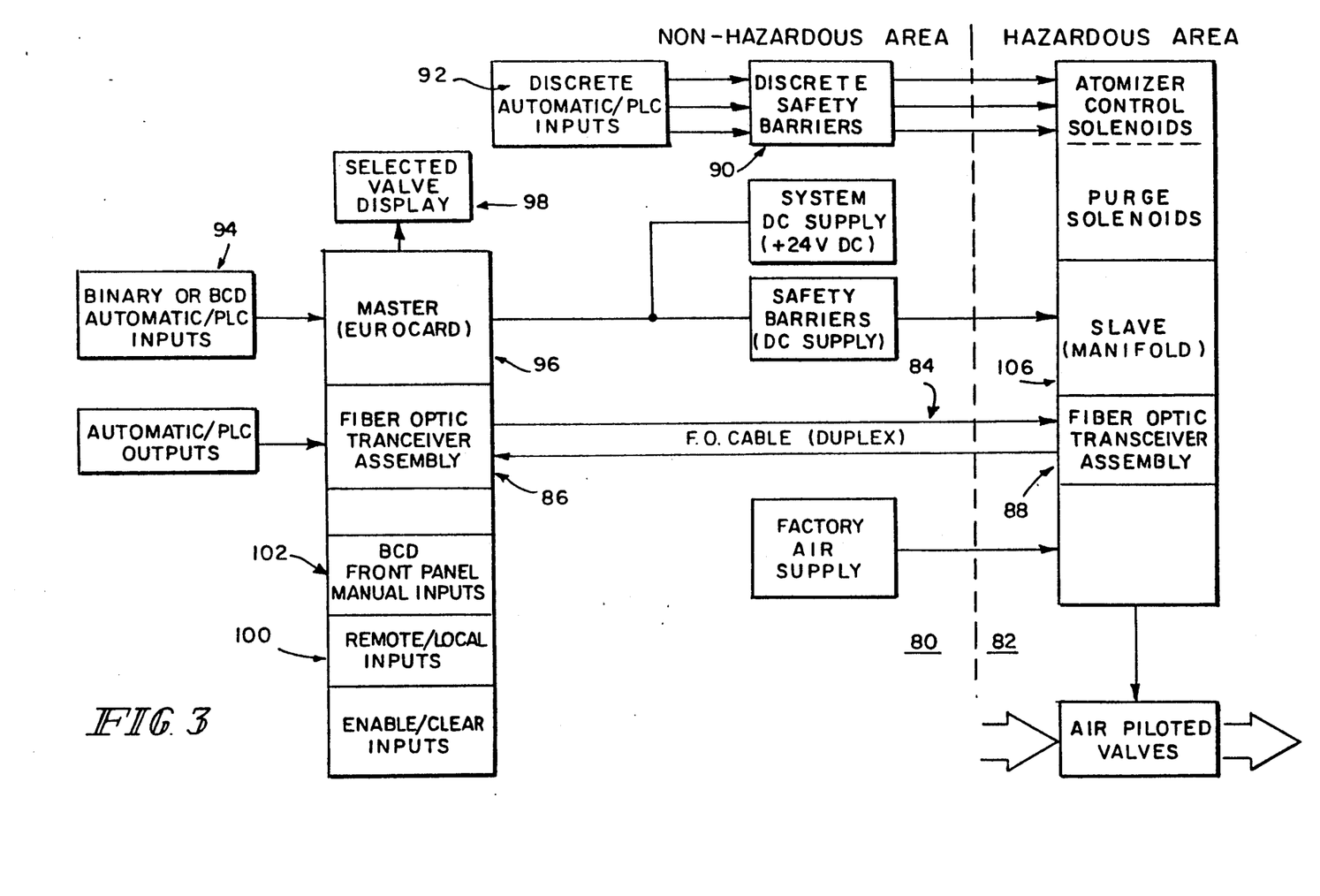
FIG. 3 illustrates a block diagram of a portion of a system constructed according to the present invention; and, FIGS. 4–7 illustrate a partly block and partly schematic diagram of a portion of a system constructed according to the present invention.

In the embodiment of the invention illustrated in FIG. 3, transmission of signals between the non-hazardous area 80 and the hazardous area 82 is achieved over a fiber optical cable 84 with duplex capability (the capability of sending signals simultaneously in both directions). The fiber optic cable 84 and its associated transceiver assemblies 86, 88 in areas 80 and 82 thus serve the functions of the safety barrier 52 and transceiver circuitry 58, 60 of FIG. 2. In the embodiment of FIG. 3, control inputs for the control of the coating functions in area 82 are provided through one or more discrete safety barriers 90 from one or more discrete automatic/PLC control input sources 92. Additionally, control inputs can be supplied across the fiber optic cable 84 from binary or BCD inputs provided automatically via PLC 94. These inputs are provided to a card multiplexer 96 which also drives a display 98 which displays system status, including, for example, color valve selection, in an appropriate format. Additional inputs are provided to multiplexer 96 from other remote or local sources 100 or from the front panel 102 of the card multiplexer 96 housing. Whatever the source(s) of these control inputs, multiplexer 96 encodes them in the established format and drives fiber optic transceiver 86 accordingly. The optical signals cross from area 80 into area 82 where they are received by a fiber optic transceiver assembly 88 associated with the slave equipment (color controlling valves $V_1$, $V_2$, ... $V_{2N}$) 106 there. The fiber optic transceiver assembly 88 associated with equipment 106 converts the received optical signal to safe electrical signals and supplies them to a demultiplexer associated with equipment 106. On receipt by the demultiplexer, these signals are demultiplexed to the signals which control valves $V_1$, $V_2$, ... $V_{2N}$ and ultimately control what colors are dispensed by the dispenser(s) in area 82 and in what sequence.

Additional control of the dispenser(s) in area 82 illustratively is provided through the discrete safety barrier(s) 90 from control input source(s) 92. These additional control signals may include, for example, dispensing device trigger position, which controls flow of whatever fluid is chosen, be it a color, solvent, low pressure air, high pressure air, or the like, through the dispensing device. They may also include solvent valve control signals, low and high pressure air control signals, and the like.

Another embodiment of the invention is illustrated in schematic and block form in FIGS. 4-7. In the following detailed description of the embodiment of FIGS. 4-7, specific circuit components and terminal numbers and names and pin numbers are provided for purposes of completeness. These terminal and pin identifiers are the specific terminal and pin identifiers for the identified circuit components. This does not constitute a representation, nor should such a representation be inferred, that there are no other circuit components available from the same or other manufacturers which will perform the described functions, or that the terminal and pin identifiers of such other circuit components will be the same as those given for the specifically identified circuit components.

Figure 4:
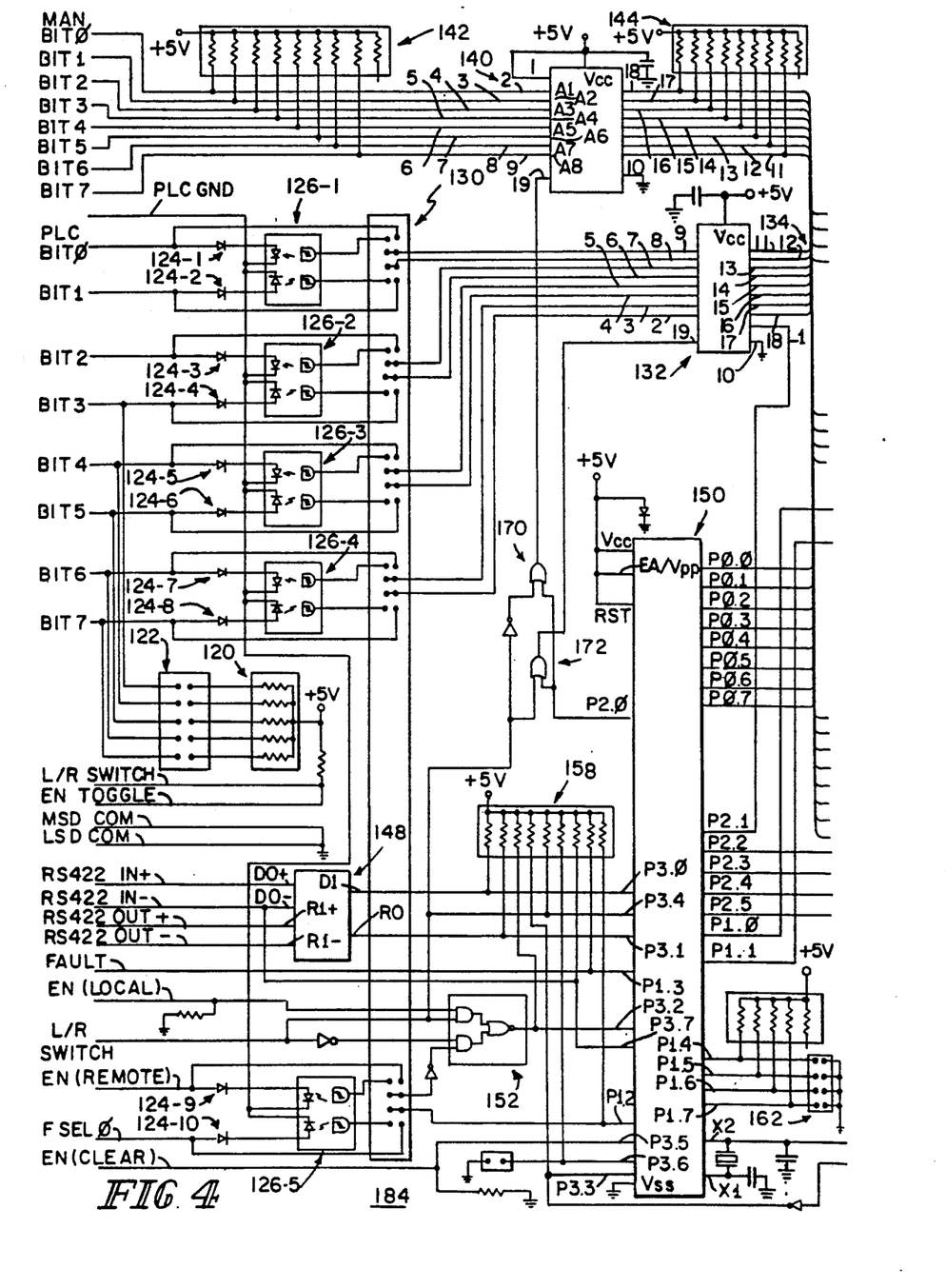

Referring to FIG. 4, color valve information in BCD or binary form is provided from an industrial controller (not shown) such as, for example, an Allen-Bradley model 5/60 programmable logic controller, to a plug J1.

The eight bits 0-7 are provided on lines B-4-B-7 and A-4-A-7, respectively, of plug J1. Unused higher bits are coupled to +5VDC through respective 1K resistors of a resistor matrix 120 through respective jumpers 122 to the unused bits. This prevents unused bits from floating low and spuriously signalling the controller. The bits are coupled through respective 1N5308 current regulating diodes 124-1 to 124-8 to the anodes of LED's in respective Hewlett-Packard HCPL-2231 optical isolators 126-1 to 126-4. Each integrated circuit 126-1 to 126-4 provides two isolators and thus is capable of providing isolation for two of the input bits on B-4–B-7 through A-4–A-7.

Diodes 124-1 through 124-8 provide 2.5 mA output current for any forward bias from 7VDC through 100VDC and so condition the input signals at terminals B-4–B-7 through A-4–A-7. The cathodes of the LED's in integrated circuits 126-1 to 126-4 are coupled to the PLC ground terminal, A-1, B-1 of plug J1. A jumper strip 130 is provided in the event that the signals at terminals B-4–B-7 through A-4–A7 are sufficiently conditioned that such isolation is unnecessary. Otherwise, the jumpers are connected to the output terminals of Schottky AND gates in the optical isolator integrated circuits 126-1 through 126-4. The output terminals, pins 7 and 6, of optical isolator integrated circuits 126-1 through 126-4 are coupled to input terminals A8–A1, respectively, of a National Semiconductor 74HCT245 bus transceiver/latch 132. The output terminals B8–B1, respectively, of bus transceiver/latch 132 are coupled to lines P0.0–P0.7, respectively, of a system bus 134.

Information can also be provided to the system bus 134 from manual pushbuttons through a plug J3. Manual bits M0–M7 are coupled to terminals A1–A8 of a National Semiconductor 74HCT245 bus transceiver/latch 140. The output terminals B1–B8, respectively, of bus transceiver/latch 140 are coupled to lines P0.0–P0.7, respectively, of the system bus 134 The input terminals A1–A8 and output terminals B-1–B-8 of bus transceiver/latch 140 are coupled to +5VDC through respective 10K pull-up resistors of 10K resistor matrices 142, 144.

Additional inputs and outputs are provided to and from the circuit illustrated in FIG. 4 for an RS-422 interface at plug J1 terminals B-10–B-13 (RS-422 OUT−, RS-422 IN+, RS-422 IN−/ FUNCTION SELECT 1, and RS-422 OUT+, respectively). These are coupled to the RI−, DO+, DO−, and RI+ terminals, respectively, of a National Semiconductor DS8921A integrated circuit differential-to-serial/serial-to-differential converter 148. Terminals DI and RO of integrated circuit 148 are coupled to terminals P3.0 and P3.1, respectively, of an Intel D87C51FA integrated circuit microcontroller 150. The RS 422 IN−/FUNCTION SELECT 1 terminal is also coupled to terminal P3.7 of microcontroller 150. A FAULT terminal of plug J1 is coupled to terminal P1.3 of microcontroller 150. An ENABLE (LOCAL) terminal of a plug J5 is coupled to an input terminal, pin 2, of a dual AND-OR invert gate 152 which serves as a signal decoder. Gate 152 illustratively is a National Semiconductor 74HC51 integrated circuit.

The ENABLE (LOCAL) terminal is also coupled to ground through a 10K pull-down resistor. A local/remote (L/R) SWITCH (CENTER) terminal is coupled through a 74HC04 inverter to input pin 4 of gate 152. The L/R SWITCH (CENTER) terminal is also coupled to input pin 3 of gate 152. An ENABLE (REMOTE) terminal of plug J1 is coupled through a 1N5308 current regulating diode 124-9 to the anode of an LED in a Hewlett Packard HCPL-2231 optical isolator 126-5. A FUNCTION SELECT 0 terminal of plug J1 is coupled through a 1N5308 diode 124-10 to the anode of the other LED in optical isolator 126-5. The cathodes of the LED's in optical isolator 126-5 are coupled to the PLC ground A-1, B-1 of plug J1. The ENABLE (REMOTE) and FUNCTION SELECT 0 terminals of plug J1 are also coupled to jumper strip 130. If the signals at these terminals are in appropriate condition, they can be jumpered directly into the remaining circuitry of FIG. 4. Otherwise, the jumpers are connected to the output terminals of the Schottky AND gates in optical isolator 126-5. Either way, the signal on the FUNCTION SELECT 0 terminal is supplied to terminal P1.2 of microcontroller 150. The signal on the ENABLE (REMOTE) terminal is supplied through a 74HC04 inverter to an input terminal, pin 5, of gate 152.

The ENABLE (CLEAR) terminal of plug J5 of the system is coupled to input terminal P3.5 of microcontroller 150 and through a 10K pull-down resistor to ground. Input terminal P3.6 of microcontroller 150 is coupled to ground if the information on plug J1, terminals B-4–B-7 and A-4–A-7 is binary. If that information is BCD, terminal P3.6 of microcontroller 150 is coupled to +5VDC through a resistor of a 10K resistor matrix 158. Additional 10K resistors of the matrix 158 couple +5VDC to terminals P1.2, P1.3, P3.0–P3.4, and P3.7. Clock signals for microcontroller 150 are provided by a 12 MHz crystal coupled across terminals X1–X2 of microcontroller 150. 30 pF capacitors are coupled between terminals X1 and X2 and ground. Terminals P0.0–P0.7 of microcontroller 150 are coupled to terminals P0.0–P0.7, respectively, of the system bus 134. Terminals P1.4–P1.7 of microcontroller 150 are coupled through respective pull-up resistors of a 10K resistor matrix to 5VDC and to jumper terminals on a jumper strip 162. The opposite jumper terminals of jumper strip 162 are coupled to ground. Placement of jumpers across selected strip 162 terminals establishes the RS-422 address of the system illustrated in FIGS. 4–7.

Figure 5:
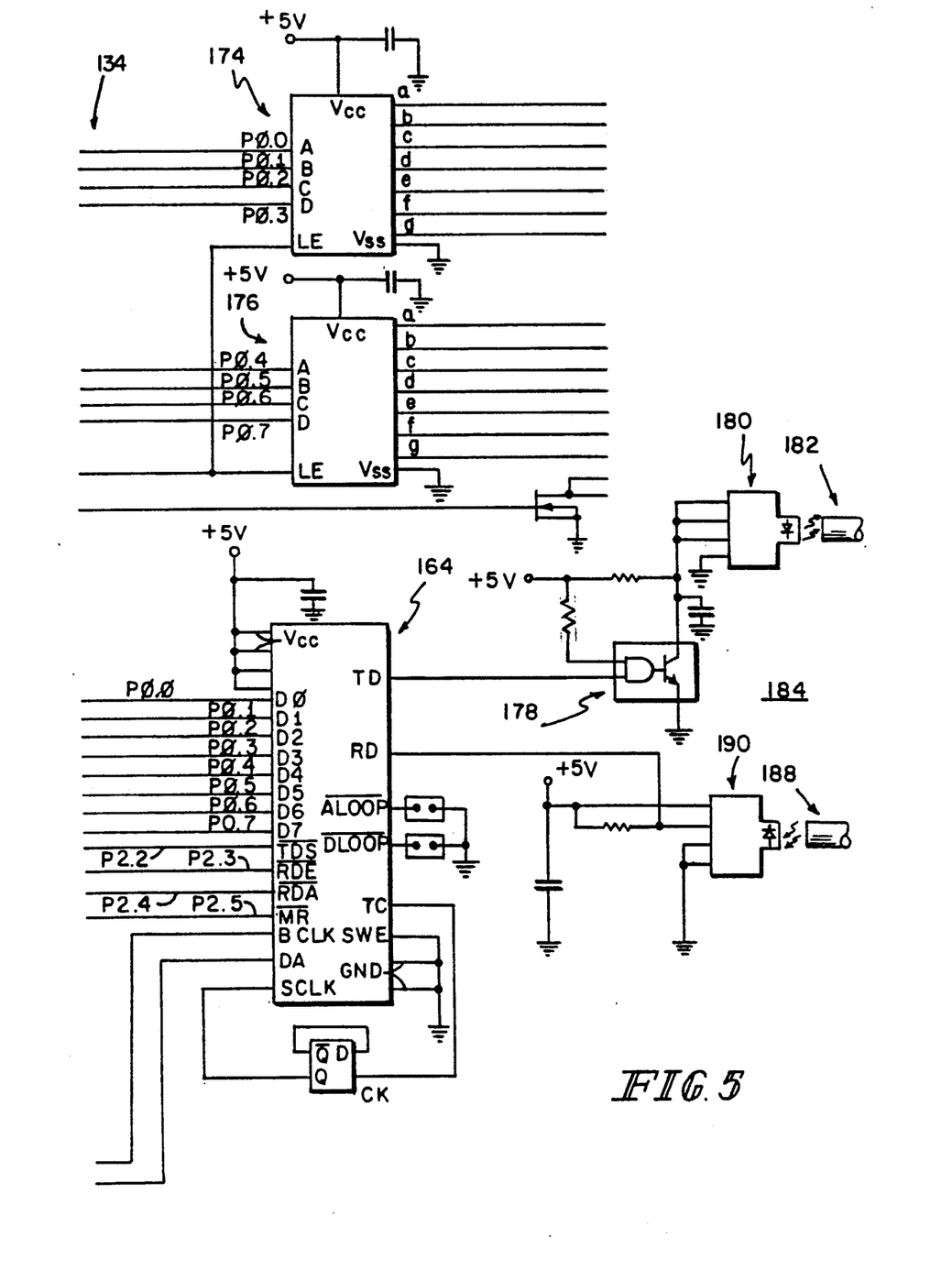
Figure 6:
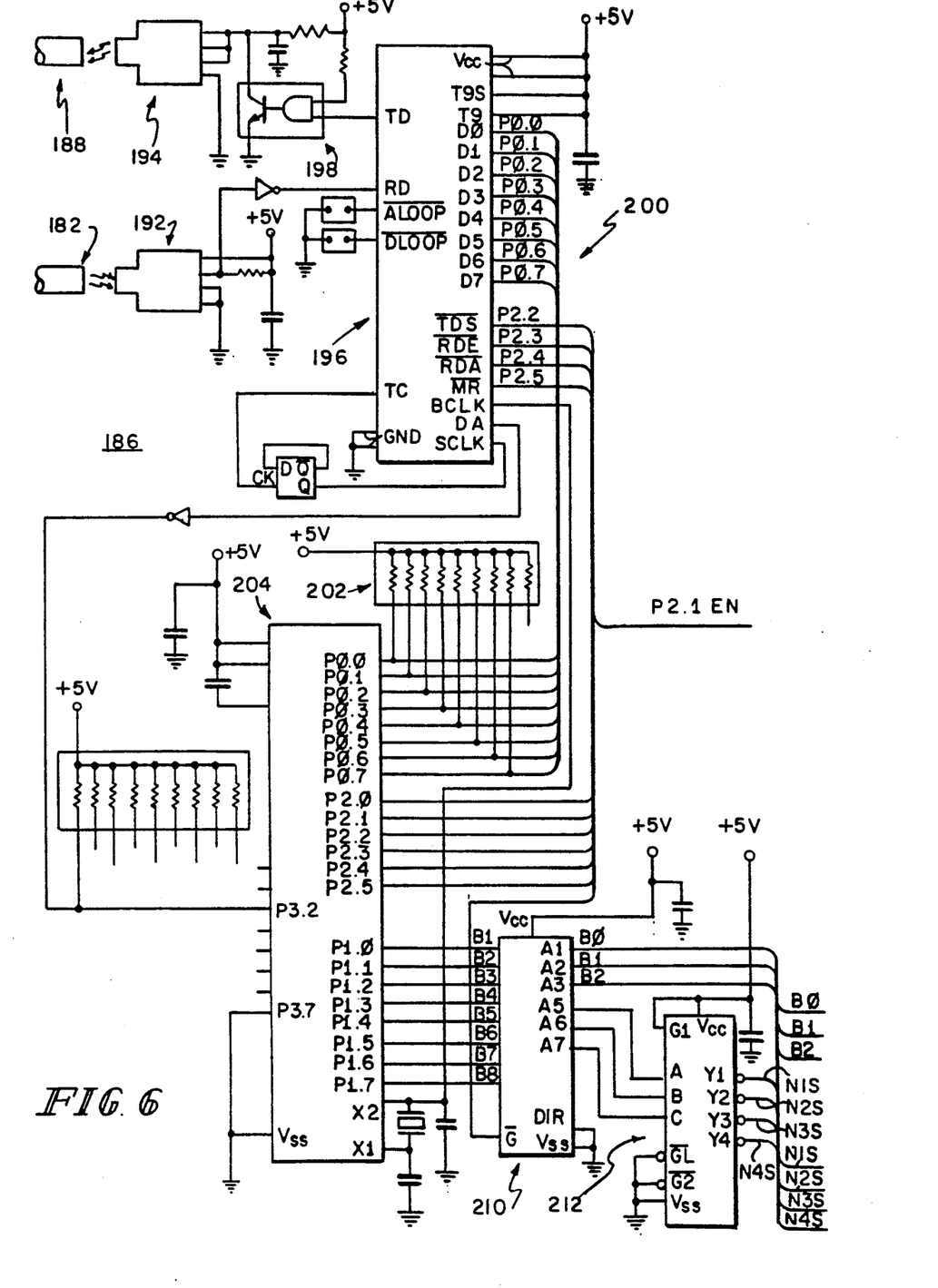

The P2.1–P2.5 terminals of microcontroller 150 are coupled to the bus 134 DIR(direction) terminal of bus transceiver/latch integrated circuit 132 and to the $\overline{TDS}$, $\overline{RDE}$, $\overline{RDA}$ and $\overline{MR}$ terminals, respectively, of a Standard Microsystems COM90C84P parallel-to-serial/serial-to-parallel transceiver 164 (FIG. 5). The BCLK terminal of transceiver 164 is coupled to terminal X2 of microcontroller 150. The DA terminal of transceiver 164 is coupled through a 74HC04 inverter to terminal P3.3 of microcontroller 150. Terminal TC of transceiver 164 is coupled to the CK terminal of a 74HC74 D flip-flop 166, the Q terminal of which is coupled to the SCLK terminal of transceiver 164. Terminals D0–D7 of transceiver 164 are coupled to lines P0.0–P0.7, respectively, of the system bus 134. Serial color valve control information in Manchester code is provided on output terminal TD of transceiver 164. Serial color valve status information in Manchester code appears as input data at input terminal RD of transceiver 164.

The L/R SWITCH (CENTER) of the system is coupled to terminal P3.4 of microcontroller 150 and through a 74HC04 inverter to an input terminal of a 74HC32 OR gate 170, the output terminal of which is coupled to terminal $\overline{G}$ of bus transceiver/latch 140 (FIG. 4). Terminal P3.4 of microcontroller 150 is also coupled to an input terminal of a 74HC32 OR gate 172, the output terminal of which is coupled to terminal $\overline{G}$ of bus transceiver/latch 132. An additional input terminal of each of OR gates 170, 172 is coupled to terminal P2.0 of microcontroller 150.

Two Motorola MC14495 BCD-to-seven segment display decoder drivers 174, 176 (FIG. 5) have their A, B, C and D input terminals coupled to bus 134 lines P0.0–P0.7, respectively. The LE input terminals of both of integrated circuits 174, 176 are coupled to terminal P1.0 of microcontroller 150. The a, b, c, d, e, f and g terminals of integrated circuits 174, 176 are coupled to terminals 14, 15, 16, 4, 3, 2, 1, 8, 9, 10, 11, 7, 6 and 5, respectively, of a Hewlett Packard HDSP-7503, two digit, seven segment display (not shown) which displays current system status, for example, which one of a number of different color valves is presently actuated. The display blanking terminals 12, 13 of the dual seven segment display are coupled to the drain terminal of a VN0808L field effect transistor, the source of which is coupled to ground and the gate of which is coupled to terminal P1.1 of microcontroller 150.

The outbound data from terminal TD of transceiver 164 is coupled to an input terminal, pin 1, of a National Semiconductor 75451 peripheral driver 178. Pin 2 of peripheral driver 178 is coupled through a 10K resistor to +5VDC, and pin 3 of peripheral driver 178 is coupled through a 180Ω resistor to +5VDC and directly to input terminals, pins 2,6 and 7, of a Hewlett Packard HFBR-1412 fiber optic link transmitter 180. Pin 4 of peripheral driver 178 and pin 3 of transmitter 180 are coupled to ground. A 30 pF capacitor is coupled across pins 3 and 4 of peripheral driver 178. The light output from transmitter 180 is coupled to one end of a 62.5/1.25 μm fiber optic cable 182 which extends from the non-hazardous area 184 into the hazardous area 186.

A complementary 62.5/125 μm fiber optic cable 188 conveys system status information back from the hazardous area 186 to the non-hazardous area 184 where that information is coupled to a Hewlett Packard HFBR-2412 fiber optic link receiver 190. The output terminal, pin 6, of receiver 190 is coupled to terminal RD of transceiver 164. Pin 2 of receiver 190 is coupled to +5VDC, to ground through a 0.1 μF capacitor, and to pin 6 through a 120Ω resistor. Pins 3 and 7 of receiver 190 are coupled to ground.

Fiber optic cables 182, 188 terminate in the hazardous area 186 at a Hewlett Packard HFBR-2412 fiber optic link receiver 192 and a Hewlett Packard HFBR-1412 fiber optic link transmitter 194, respectively. The output terminal, pin 6, of receiver 192 is coupled through a 74HCT04 inverter to the RD terminal of a Standard Microsystems COM90C84P parallel-to-serial/serial-to-parallel transceiver 196. Pin 2 of receiver 192 is coupled to +5VDC, to ground through a 0.1 μF capacitor and to pin 6 of receiver 192 through a 120Ω resistor. Pins 3 and 7 of receiver 192 are coupled to ground. The TD terminal of transceiver 196 is coupled to an input terminal, pin 2, of a National Semiconductor 75451 peripheral driver 198. Pin 1 of peripheral driver 198 is coupled through a 10K resistor to +5VDC. Pin 3 of peripheral driver 198 is coupled through a 180Ω resistor to +5VDC, directly to pins 2, 6 and 7 of transmitter 194, and to ground through a 30 pF capacitor. Pin 4 of peripheral driver 198 is coupled to ground, as is pin 3 of transmitter 194.

Terminals D0-D7 of transceiver 196 are coupled to the P0.0-P0.7 lines, respectively, of a hazardous area bus 200. These lines of the bus 200 are coupled through respective 10K resistors of a 10K resistor matrix 202 to +5VDC. These lines are also coupled to the P0.0-P0.7 terminals, respectively, of an Intel D87C51FA microcontroller 204. The $\overline{TDS}$, $\overline{RDE}$, $\overline{RDA}$ and $\overline{MR}$ terminals of transceiver 196 are coupled through the bus 200 to terminals P2.2-P2.5 of microcontroller 204. A 12MHZ crystal is coupled across terminals X1, X2 of microcontroller 204 and each of terminals X1, X2 is coupled to ground through a 30pF capacitor. Terminal X2 of microcontroller 204 is coupled to the BCLK terminal of transceiver 196.

The TC terminal of transceiver 196 is coupled to the CK terminal of a 74LS74 D flip flop, the Q terminal of which is coupled to the SCLK terminal of transceiver 196. The DA terminal of transceiver 196 is coupled through a 74HCT04 inverter to the P3.2 terminal of microcontroller 204. The P1.0-P1.7 output terminals of microcontroller 204 are coupled to the B1-B8 terminals, respectively, of a National Semiconductor 74HC245 octal latch 210 which latches the color valve selection information from the microcontroller 204. The decoded color valve bits for valves numbered 0-7 appear on terminals A1-A3 of octal latch 210.

An additional three bits of information, on output terminals A5-A7 of octal latch 210, are coupled to the input terminals A, B and C, respectively, of a National Semiconductor 74HC137 three-to-eight decoder 212. The inverted information on output terminals Y1-Y4 of decoder 212 is the address of one of four cards, each of which controls eight color valves. Thus, only one card at a time will be energized and it will only be possible then to energize one of the eight color valves controlled by that card. Only two intrinsic barriers per system of FIGS. 4-7 will thus be required, one to power the one card of the four which is addressed on one of terminals Y1-Y4 of three-to-eight decoder 212, and the other to power the one color valve on that addressed card addressed by the signals on terminals A1-A3 of octal latch 210. Selection of the card and the color valve on that card is ENABLED by a signal coupled through bus 200 from terminal P2.1 of microcontroller 204. Octal latch 210 is enabled by a signal coupled to its terminal $\overline{G}$ from terminal P2.0 of microcontroller 204.

Figure 7:
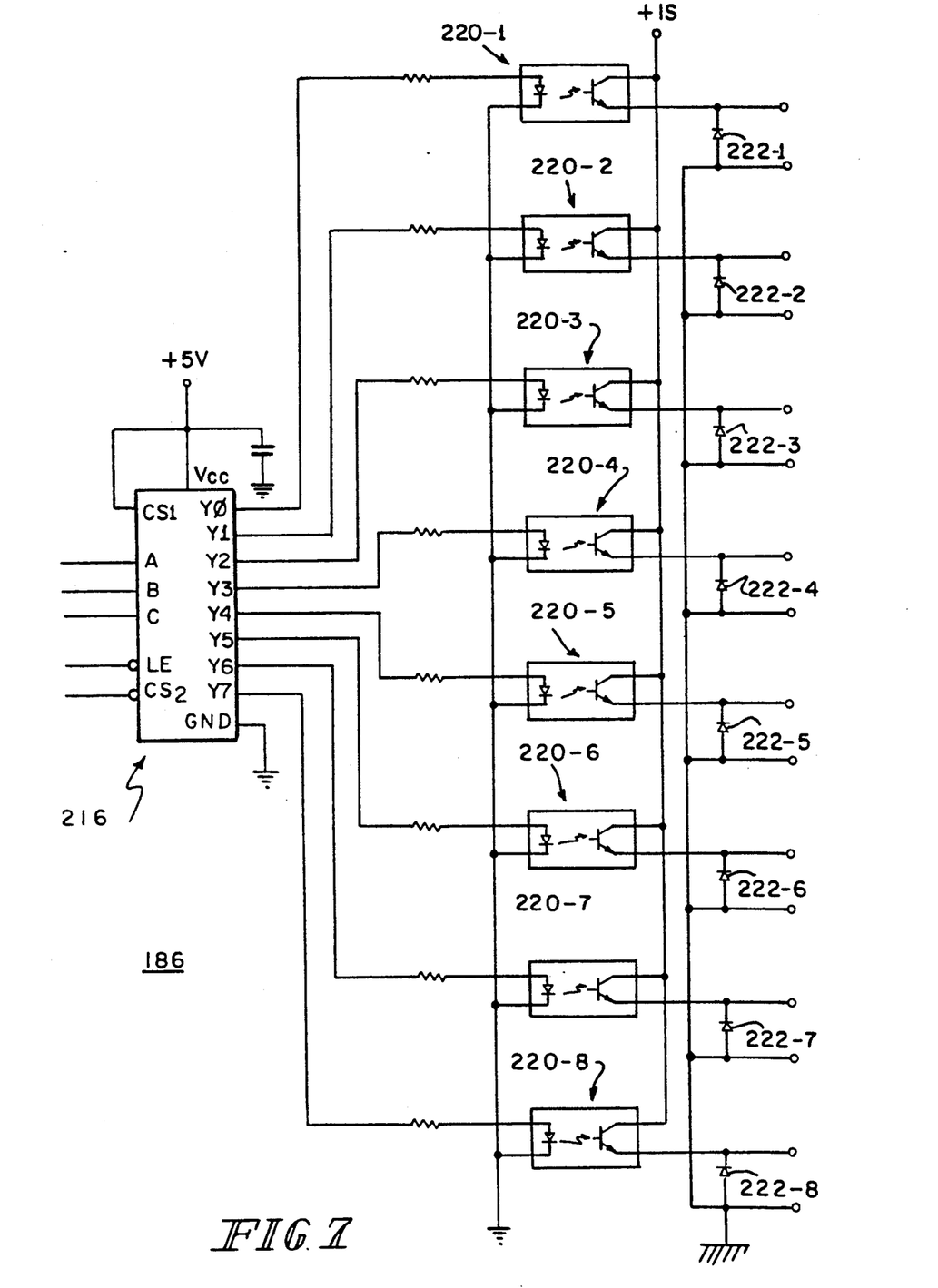

Each of the four cards controlled by microcontroller 204 contains the circuitry illustrated in FIG. 7. The input terminals A, B and C of a National Semiconductor 74HC237 three-to-eight decoder 216 on each of the four cards are coupled to the A1-A3 output terminals of octal latch 210. The LE input terminals of all four three-to-eight decoders 216, inverted, are coupled to the P2.1 output terminal of microcontroller 204. The CS2 input terminal of each of the four three-to-eight decoders 216, inverted, is coupled to a respective one of the inverted Y1-Y4 output terminals of three-to-eight decoder 212.

The Y0-Y7 output terminals of each three-to-eight decoder 216 are coupled through respective 390Ω resistors to the anodes of respective LED's in respective Motorola MOC8021 optical couplers 220-1-220-32, only eight, 220-1-220-8, of which are illustrated in FIG. 7. The cathodes of the LED's in optical couplers 220-1-220-32 are all coupled to ground. The output terminal, pin 5 of each optical coupler 220-1-220-32 is coupled to the intrinsic safety barrier output voltage source. The output terminal, pin 4, of each optical coupler 220-1-220-32 is coupled to one terminal of the actuating solenoid (not shown) of a respective one of the thirty-two valves on a color manifold. The other terminals of all of the solenoids are coupled to ground. A flyback diode 222-1-222-32, only eight, 222-1-222-8, of which are illustrated, is coupled across the terminals of each solenoid to damp the flyback pulse which results when that solenoid is deenergized.

The invention dramatically reduces system cost by passing encoded or multiplexed information to the booth, rather than using discrete control for every color valve. It will be appreciated that the present system reduces the number of PLC output modules and eliminates bundles of pneumatic lines, conductors, and the like. In doing so, it reduces system layout and installation time. It reduces system space requirements by reducing the number of color valve control modules. It also employs a self-diagnostic valve controller.

The system of the invention manipulates manual (switch) or automatic (PLC) information and drives electropneumatic solenoids within a hazardous area for color valve selection.

The system receives valve selection information from manual and automatic inputs and encodes this information for transmission into the hazardous area through a serial data link, thus reducing the number of safety barrier devices devoted to information transmission purposes. Within the hazardous area, the information is decoded and the corresponding valve is energized through a multiplexing circuit and a MOSFET. The multiplexing circuitry permits only one valve to be energized at a time.

A significant distinction between this system and existing devices is the multiplexing of data for color valve selection. In certain embodiments, a serial data link is employed between the non-hazardous and hazardous areas for multiplexed data transmission.

Since only one valve is required to be energized at a time, only a single safety barrier is required for solenoid valve actuation. A serial data link may require an additional safety barrier for non-fiber optic transmission media.

The system of the present invention offers the advantage of reducing the number of control inputs and safety barriers required for a given number of outputs. Response time is greatly enhanced due to the close physical proximity of the electropneumatic solenoids to the air piloted valves.

What is claimed is:

1. A coating material dispensing system comprising a hazardous area and a non-hazardous area, multiple coating material type controls, each having a coating material input port, a coating material output port and a control port for controlling the passage of a type of coating material controlled by that particular coating material type control from its input port to its output port, means for generating control signals for controlling the multiple coating material type controls, means for multiplexing the control signals, means for demultiplexing the multiplexed controlled signals, means for coupling the means for generating the control signals to the multiplexing means, means for coupling the multiplexing means to the demultiplexing means, and means for coupling the demultiplexing means to the multiple coating material type controls, the demultiplexing means and coating material type controls being intrinsically safe and provided in the hazardous area, and the means for generating control signals and the multiplexing means being provided in the non-hazardous area.

2. The apparatus of claim 1 wherein the means for coupling the multiplexing means to the demultiplexing means comprises a serial data link.

3. The apparatus of claim 2 wherein the serial data link comprises a fiber optic cable.

4. The apparatus of claim 3 wherein the fiber optic cable is a duplex fiber optic cable.

5. The apparatus of claim 1 wherein the means for coupling the multiplexing means to the demultiplexing means comprises a parallel data link.

6. The apparatus of claim 5 wherein the parallel data link comprises multiple channels, each channel including an optical isolator.

7. The apparatus of claim 5 wherein the means for coupling the demultiplexing means to the coating material type controls comprises drivers, means for coupling each output of the demultiplexer to an input of a respective one of the drivers, and means for coupling an output of each respective driver to a respective one of the coating material type controls.

8. The apparatus of claim 7 wherein each one of the coating material type controls comprises an electrical to pneumatic solenoid valve.

9. The apparatus of claim 1, 2, 3, 4, 5, 6, 7 or 8 and further comprising a power supply for providing power for the multiplexer and demultiplexer, and means for coupling the power supply to the multiplexer and demultiplexer.

10. The apparatus of claim 9 wherein the means for coupling the power supply to the demultiplexer comprises a current barrier.

* * * * *